United States Patent [19]
Veldman et al.

[11] Patent Number: 5,864,996
[45] Date of Patent: Feb. 2, 1999

[54] GASKETED PANEL

[75] Inventors: Roger L. Veldman, Zeeland; Raj K. Agrawal, Holland, both of Mich.

[73] Assignee: Donnelly Corporation, Holland, Mich.

[21] Appl. No.: 528,751

[22] Filed: Sep. 15, 1995

Related U.S. Application Data

[63] Continuation of Ser. No. 201,248, Feb. 24, 1994, abandoned.

[51] Int. Cl.$^6$ ........................................................ E06B 3/54
[52] U.S. Cl. .................................. 52/240.597; 52/204.59; 156/322; 296/93
[58] Field of Search .............................. 52/208, 204–597; 296/93, 96.21, 146.15, 201; 156/108, 315, 322

[56] References Cited

U.S. PATENT DOCUMENTS 3,478,475  11/1969  Strack .
3,579,004   5/1971  Kent .

(List continued on next page.)

FOREIGN PATENT DOCUMENTS

P3434026.2  9/1984  Australia .
474446/85   3/1986  Australia .

(List continued on next page.)

OTHER PUBLICATIONS

SAE Technical Paper No. 910758; Application of RIM Urethane to One Side of Glass for Automotive Windows; Csokasy and Kubizne; Presented: Feb. 25, 1992.

Paper No. 900519; Case Study, An Encapsulated Window Program Between a U.S. Suppllier and a Japanese Automobile Company; Csokasy and Jager.

MSDS—Essex Specialty Products, Inc. for Betaseal™ 43.555 Primer dated Sep. 27, 1991.

MSDS—Essex Specialty Products, Inc. for Betaseal® 573.02 Urethane Adhesive dated Jun. 17, 1993.

GM 9985836 PVC Primer Process Standard for Essex Betaseal 535.55 PVC Primer published by Essex Specialty Products dated Apr. 1991.

Betaseal® Vinyl Primer 435.52 brochure prepare by Essex Specialty Products, Inc.

Engineering Material Specification prepared by Ford Motor Company for Adhesive, Urethane—One Component–High Viscosity (VESB–M2G246–A and ESB–M2G246–B) dated 1982.

*Primary Examiner*—Michael Safavi
*Attorney, Agent, or Firm*—Van Dyke, Gardner, Linn & Burkhart, LLP

[57] ABSTRACT

A window panel assembly to be bonded to a vehicle body opening using a conventional, window fixing urethane adhesive disposed between the vehicle pinch-weld flange and a polymeric gasket attached to the window panel. The joint produced between the window fixing adhesive and the polymeric gasket has a bond strength and performance greater than that achieved in conventional metal-to-glass bonds using the same fixing adhesive. The panel assembly of this invention may be sent to the automobile manufacturer so that all the installer needs to do is apply the window fixing adhesive between the gasket and the vehicle in a conventional manner. The strong bond can be achieved even after the panel assembly has been in storage for days, weeks, or even several months prior to installation. The panel assembly includes a gasket bonded to a sheet-like panel and having a surface adapted to receive a window fixing adhesive for bonding the sheet-like panel in the vehicle opening. An adhesion-promoting compound is applied to the gasket surface and heated to a transition temperature of at least about 60° C. When raised to at least this temperature, the adhesion-promoting compound and gasket bond with the fixing adhesive when the window panel assembly is installed. A load exerted on the joint sufficient to cause a failure results in a cohesive failure of the gasket, the fixing adhesive, or both, but not of the adhesion between the gasket and fixing adhesive. A method is also provided for making the panel assembly of this invention.

28 Claims, 6 Drawing Sheets

U.S. PATENT DOCUMENTS

| | | | |
|---|---|---|---|
| 3,659,896 | 5/1972 | Smith et al. | 296/93 |
| 3,707,521 | 12/1972 | De Santis . | |
| 3,837,984 | 9/1974 | Wagner et al. . | |
| 3,916,055 | 10/1975 | Wagner . | |
| 3,967,424 | 7/1976 | Gates . | |
| 3,981,113 | 9/1976 | Griffin . | |
| 4,093,304 | 6/1978 | Ziegler . | |
| 4,247,510 | 1/1981 | Desverchere . | |
| 4,571,278 | 2/1986 | Kunert . | |
| 4,606,159 | 8/1986 | Kunert . | |
| 4,625,459 | 12/1986 | Warner . | |
| 4,635,415 | 1/1987 | Schumacher et al. . | |
| 4,681,794 | 7/1987 | Kunert et al. . | |
| 4,839,122 | 6/1989 | Weaver . | |
| 4,841,698 | 6/1989 | Gold . | |
| 4,879,853 | 11/1989 | Braendle et al. . | |
| 4,894,972 | 1/1990 | Endoh et al. . | |
| 4,910,071 | 3/1990 | Kunert . | |
| 4,925,511 | 5/1990 | Ikeoa et al. | 296/84.1 |
| 4,933,032 | 6/1990 | Kunert . | |
| 4,938,521 | 7/1990 | Kunert . | |
| 4,951,907 | 8/1990 | Gold . | |
| 4,986,595 | 1/1991 | Gold . | |
| 4,994,315 | 2/1991 | Schreiber et al. . | |
| 5,057,265 | 10/1991 | Kunert et al. . | |
| 5,057,354 | 10/1991 | Kunert et al. . | |
| 5,061,249 | 10/1991 | Yoshihara et al. . | |
| 5,062,248 | 11/1991 | Kunert . | |
| 5,064,494 | 11/1991 | Duck et al. . | |
| 5,082,736 | 1/1992 | Bravet et al. . | |
| 5,154,028 | 10/1992 | Hill et al. . | |
| 5,211,792 | 5/1993 | Carter | 156/322 X |

FOREIGN PATENT DOCUMENTS

| | | |
|---|---|---|
| 0163194A3 | 12/1985 | European Pat. Off. . |
| 0371810A3 | 6/1990 | European Pat. Off. . |
| 0390151A2 | 10/1990 | European Pat. Off. . |
| 01745981A2 | 4/1986 | Germany . |
| 62-251229 | 4/1988 | Japan . |
| 62-257831 | 4/1988 | Japan . |
| 63-112143 | 9/1988 | Japan . |
| 451507 | 8/1936 | United Kingdom . |
| 1347255 | 2/1974 | United Kingdom . |

1

GASKETED PANEL

CROSS-REFERENCE TO RELATED CASE

This is a continuation of application Ser. No. 08/201,248 filed Feb. 24, 1994, for IMPROVED GASKETED PANEL AND METHOD FOR MAKING AND USING SAME, now abandoned.

FIELD OF THE INVENTION

This invention relates to window panel assemblies for use in vehicles and, more particularly, to a vehicle window assembly which is adhered directly to a vehicle body panel with an adhesive dispensed on the gasket or a portion thereof, and which provides a bond having a load performance and environmental weathering performance equivalent to that currently achieved by dispensing the adhesive between the glass or frit surface and the pinch weld flange of the vehicle.

BACKGROUND OF THE INVENTION

Modular vehicle window assemblies have enjoyed widespread use. Conventional modular vehicle window assemblies include a sheet-like panel of glass having a polymeric gasket or casing disposed about the peripheral edge. The polymeric gasket may encapsulate the edge of the panel as well as a predetermined portion of each side of the panel. Such a "three-sided" encapsulation not only spaces the panel from the vehicle opening, but also seals the outer surface of the panel against the vehicle. More recently, single-sided assemblies have been designed in which a polymeric gasket or spacer is located on only one side of the window panel, preferably near the peripheral edge. Such single-sided gaskets enable mounting of the resultant window assembly in the vehicle such that the outer glass surface is flush with the vehicle body exterior thereby reducing wind drag and noise and increasing fuel economy and aesthetic appeal. Both the three-sided and single-sided gaskets are made from thermoplastic compounds such as polyvinyl chloride, polyolefins, thermoplastic urethanes, thermoplastic elastomers, as well as thermosetting compounds such as reaction-injection molded (RIM) urethane, EPDM, rubbers, etc.

Urethane sealants are used commonly by the automobile manufacturers to securely attach the above-described window assemblies to the vehicle body. The adhesive is typically located on the inside surface of the glass window panel adjacent the gasket and pressed into contact with the sheet metal forming the window opening. This metal-to-glass bond has proven successful in surviving moisture and humidity exposure as well as providing a strong bond. Disadvantages associated with the metal-to-glass bond include requiring a wider black-out coating or area, typically formed with a layer of opaque ceramic frit fired onto the inside glass surface, to conceal the bond, and a larger pinch-weld flange on the vehicle to receive the bond.

Another bonding technique used to mount the window assemblies in the vehicle opening is an adhesive between an adhesion-promoting compound on the gasket material and the metal flange forming the opening. To date, the strength of such alternative bond has not been equivalent to or as satisfactory as the bond strength and environmental stability of adhesive bonds achieved directly between the metal flange to the glass panel. When a failure of such an alternative bond occurs, the failure usually occurs along the interface of the adhesion-promoting primer and the gasket, which can result in water leaks and wind noise. A further disadvantage with this particular technique is that once the adhesion-promoting compound is applied, the urethane sealant must be applied within a relatively short time to obtain the best available bond. The adhesion-promoting compound has a very short idle time once applied. This requires that the compound and urethane sealant be applied to the panel by the window installer at the time of installation.

Yet, an advantage provided by this alternative bonding technique is that the window panel may have a narrower black-out or frit boundary and the window opening may be defined by a narrower pinch-weld flange thereby reducing vehicle weight while increasing the field of view through the window. However, because the window panels are becoming an important structural component of the vehicle, failure of the bond between the panel and the vehicle may result in further damage to the vehicle or compromise vehicle safety.

Obtaining sufficient window-to-vehicle bond strength has in the past often required a series of complex, involved, or time-consuming preparation steps at the vehicle manufacturing site. For example, application or reapplication of an adhesion-promoting primer compound to the gasket or vehicle flange immediately prior to window assembly installation is often required to achieve necessary bonding strength. Such steps have added cost to the vehicle while increasing manufacturing time, among other disadvantages.

Accordingly, a need was recognized for an improved bond between a gasketed window assembly and a vehicle which would provide an improved bond strength while achieving increased window opening area, reduced vehicle weight, increased fuel economy, and long-term weather resilience, particularly exposure to moisture. Further, a reduction in time-consuming window installation steps at the vehicle manufacturing site was also desired.

SUMMARY OF THE INVENTION

The instant invention provides a window panel assembly which may be manufactured and prepared for vehicle installation off-site at a location different from that of final vehicle assembly, sent to the automobile manufacturer, and bonded to the vehicle opening using a conventional window fixing adhesive (typically urethane) disposed between the vehicle pinch-weld flange of the vehicle body and the polymeric gasket on the window assembly. The panel assembly of this invention may be sent to the automobile manufacturer in a completed form so that all the installer needs to do is apply the adhesive between the gasket and the vehicle in a conventional manner. The open time between off-site manufacture of the window assembly and use by the vehicle manufacturer is sufficiently long that off-site manufacture is practical and effective. No further preparation steps need be required by the installer to achieve a joint to the vehicle body (usually metal or composite) suitable for the intended user lifetime of the vehicle. Most preferably, the bond strength achieved using the methods of this invention is at least equal to that achieved between the vehicle body and window glass using the same adhesive.

According to one form of the invention, the panel assembly includes a sheet-like panel having opposite sides terminating in a peripheral edge, a gasket attached to at least one side of the sheet-like panel and having a surface to receive an adhesive for mounting the window assembly in the vehicle opening, and an adhesion-promoting compound, said adhesion-promoting compound having a transition temperature; and the adhesion-promoting compound being exposed, while in contact to said gasket, to a temperature at least equal to the transition temperature, thereby to improve the bond between the gasket and the window fixing adhesive applied on a surface of the gasket. The bonding method of the invention produces a joint between the gasket and the vehicle body that is a significant improvement over the gasket-to-vehicle body joint achievable without the benefit of this invention. Most preferably, the performance of the joint is at least equal to that obtained using the same window fixing adhesive (typically a moisture-cured urethane) between the window glass and the vehicle body (typically metal).

The panel assembly of this invention is manufactured by the steps including providing a sheet-like window panel having opposite sides, attaching a polymeric gasket to at least one side of the window panel and having at least one surface to receive the window fixing adhesive, applying an adhesion-promoting compound of this invention to the surface of the gasket to receive the fixing adhesive, and heating the adhesion-promoting compound/gasket combination to at least a predetermined transition temperature. Typically and preferably, the steps of applying the adhesion-promoting compound of this invention to the gasket and the heating of the combination to at least a predetermined transition temperature occur at a time in advance of, and typically at a different location from, receipt of the window fixing adhesive. Once the panel assembly is made, it is packaged and ready for shipment to the vehicle assembler.

The advantages provided by this invention include window panels having narrower black-out or frit coatings adapted to be received by narrower pinch-weld flanges to mount the window assembly in the vehicle opening. A further advantage is that the method works on existing window panels having polymeric gaskets. The end result is a joint of improved performance such as in strength and moisture resilience compared to that achieved using conventional bonding methods while providing increased viewing area and reduced vehicle weight as compared to conventional window assemblies. A still further advantage is that the bond to the window fixing adhesive can be achieved even after the panel assembly has been in storage for a prolonged period prior to installation. Window assemblies can also be made away from the vehicle manufacturing site without sacrificing bond quality. Thus, the panel assemblies can be manufactured on a calendar schedule ahead of final vehicle assembly. Lastly, the bond strength and overall performance provided by the present invention using the conventional urethane adhesive between the gasket and the vehicle body flange has heretofore been unattainable.

BRIEF DESCRIPTION OF THE DRAWING FIGURES

A better understanding of the invention and the advantages provided thereby may be obtained by reference to the specification and the attached drawing figures, wherein.

DETAILED DESCRIPTION OF THE PREFERRED EMBODIMENTS

Figure 2:
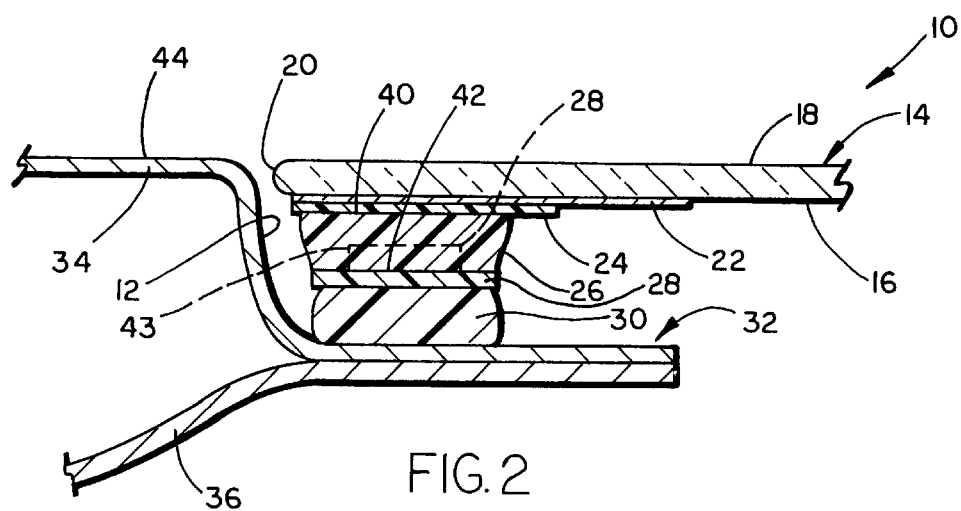
FIG. 2 is a fragmentary, cross-sectional view of a window panel mounted in the vehicle opening according to one embodiment of the invention.
Figure 3:
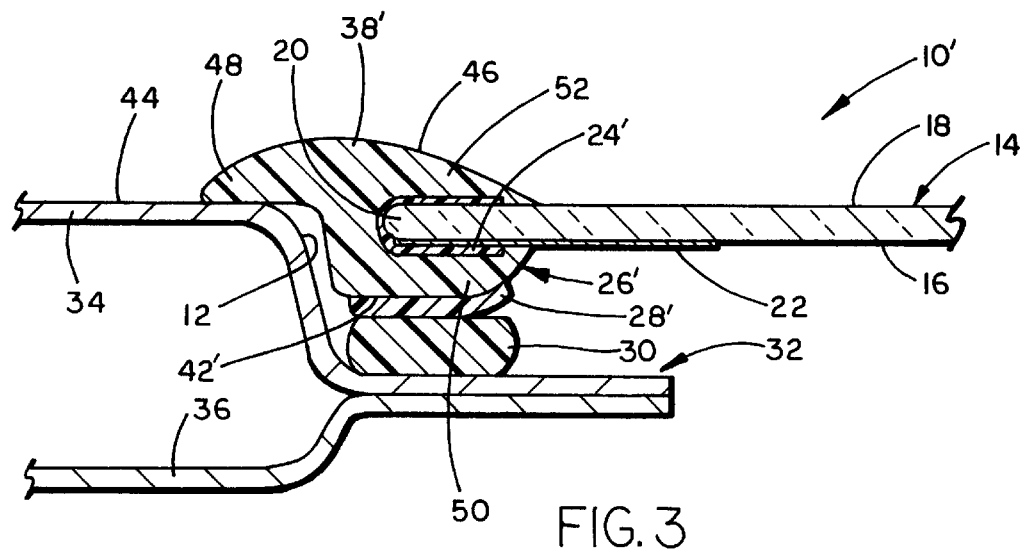
FIG. 3 is a fragmentary cross-sectional view of another embodiment of a window panel incorporating the present invention and mounted in the vehicle opening.

For the purposes of the following description, the terms "upper," "lower," "right," "left," "front," "rear," "vertical," "horizontal," and "derivatives or equivalents thereof" shall relate to the invention as oriented in FIGS. 2 and 3. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

Assembly

Figure 1:
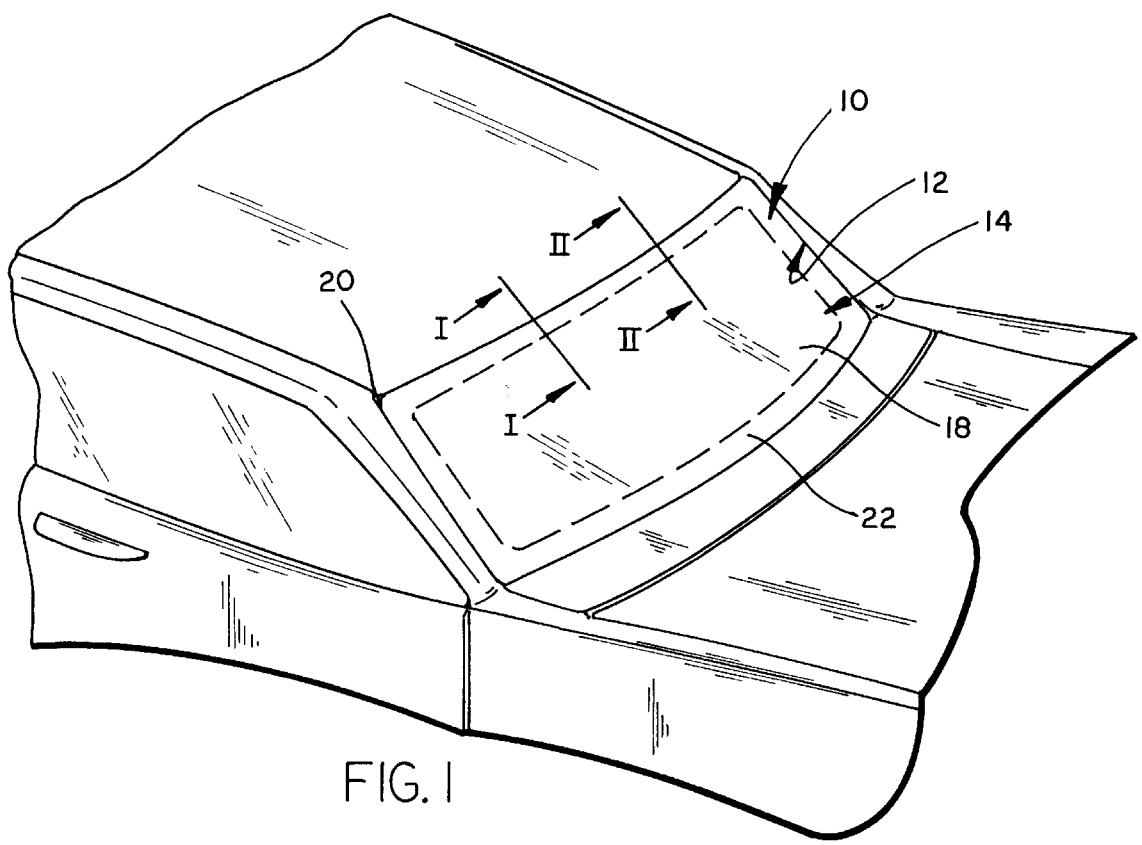
FIG. 1 is a fragmentary, perspective view of a window panel incorporating the present invention and mounted in a vehicle opening.

Referring now to the drawing figures, a vehicle panel window assembly 10 is shown mounted in a vehicle window opening 12. Although FIG. 1 illustrates the application of the instant invention in a windshield or backlite, the invention may be applied equally as well to other window panel assemblies such as fixed or hinged side lites used in station wagons, panel vans, and the like, and may also be used to fix window panels in a window opening in the roof of the vehicle. It is also contemplated that the same structure and method may be used for panel assemblies in buildings, ships, airplanes, trains, and other vehicles.

FIG. 2 illustrates one embodiment of a single-sided gasketed panel assembly 10 of the present invention specifically adapted for closing a window opening 12 in a vehicle. Panel assembly 10 is of the type described in copending, commonly assigned U.S. Pat. No. 5,544,458, the disclosure of which is hereby incorporated herein by reference, and includes a panel or sheet 14, preferably of transparent glass which may be tempered, laminated, or otherwise strengthened using conventional techniques and principles. Sheet 14 has two substantially parallel sides, surfaces, or faces 16, 18, which terminate at a peripheral edge 20 and define a panel of predetermined geometric shape. Although transparent glass is preferred, other sheet-like panel materials may be used such as opaque or coated glass; transparent, coated, or opaque plastic materials; or multi-composite laminates, such as transparent glass and plastic, and/or transparent glass laminated with polyvinyl butyral (PVB) plastic.

Optionally deposited on and bonded to surface 16 of panel 14 is an opaque, and preferably dark or black, frit layer 22. Most preferably, frit layer 22 is a ceramic coating covering and concealing a region from a position immediately adjacent peripheral edge 20 inwardly. Fixed to ceramic frit layer 22, and extending along and around at least a portion of sheet 14 and spaced in from peripheral edge 20, is a flexible, resilient polymeric form 26 which defines a static spacer, gasket, or grommet (hereinafter "gasket") intended to be adhered to pinch-weld flange 32 by a bead of adhesive 30 when installed. It is preferred that polymeric gasket 26 be formed from a thermoplastic material such as polyolefins, chlorinated polyolefins, vinyls, and thermoplastic elastomers selected from a group of thermoplastic vulcanizates (TPV), thermoplastic urethanes (TPU), thermoplastic olefins (TPO), EPDMs, polyolefins, and thermosetting polymeric materials such as reaction-injection molded urethanes, and rubbers. It is most preferred to form gasket 26 from a flexible polyvinyl compound such as polyvinyl chloride (PVC) available from Vista Chemical Company of Jeffersontown, Kentucky, sold under the designation VISTA™ brand 484.51 PVC.

In the embodiment shown in FIG. 2, gasket 26 includes a body 38 of generally trapezoidal cross section having a first surface 40 in intimate contact with, and bonded to, ceramic frit layer 22. An opposite surface 42 is generally flat along the entire length of the gasket 26, although it is contemplated that a longitudinal channel or one or more depressions 43 may be defined therein to receive adhesive 30 (shown in phantom in FIG. 2). It is preferred that gasket 26 have a width less than or equal to 0.75 inch and a thickness less than or equal to 1.0 inch; however, the thickness and width of gasket body 38 may vary depending upon the application of window panel assembly 10. Preferably, the thickness of gasket body 38 will result in glass surface 18 being flush with vehicle surface 44 as described below. Panel 14 may also have a gasket 26 with more than one cross-sectional profile, or might have separate portions of the same or differing size, thickness, width, and/or profile. Gasket 26 may be made using a variety of techniques, including injection molding, gas-assisted injection molding, extrusion, reaction-injection molding, slush molding, pour molding, blow molding, or casting using any one of the materials described above. The desired fabrication process is that of molding, and preferably injection molding, using the preferred PVC material described above.

Bonding gasket 26 to ceramic frit layer 22 is an adhesive primer layer 24. Adhesive 24 can be an acrylic base primer such as A-1100B/A-1167B available from B.F. Goodrich Company of Akron, Ohio; A-57 available from Donnelly Corporation of Holland, Mich.; urethane-primers such as Dorrie 90-24 available from the Dorrie Process Co., Inc., of Norwalk, Conn.; or any other suitable primer. Deposited on surface 42 of gasket 26 is a coating of adhesion-promoting compound 28 of this invention, described in greater detail below.

In a preferred embodiment, a bead 30 of moisture-curable urethane adhesive such as BETASEAL™ brand 573.02 urethane (a conventional window fixing adhesive) available from Essex Specialty Products, Inc., or the like, such as described in U.S. Pat. No. 3,707,521 entitled POLYURETHANE SEALANT-PRIMER SYSTEM ISOCYANATE-REACTIVE SURFACE PRIMER COMPOSITION FOR POLYURETHANE SEALANTS to G. William De Santis is applied either to gasket surface 42 containing adhesion-promoting compound 28, or on pinch-weld flange 32, before locating window panel assembly 10 in the vehicle window opening 12. With the window panel assembly 10 located in window opening 12, the installer presses upon panel 14 so that window fixing urethane adhesive 30 is compressed against adhesion-promoting compound 28 on gasket surface 42 until the outer surface 18 of window panel 14 is substantially flush with the outer surface 44 of the vehicle body formed by sheet metal 34. If window assembly 14 is installed by the automobile manufacturer, a mechanical robotic arm may locate and press panel 14 into position. Each of the elements shown in FIG. 2 are somewhat exaggerated to clearly illustrate the relationship between the components.

In another embodiment shown in FIG. 3, vehicle window panel assembly 10' includes a window or sheet-like panel 14, having a first inner side 16 and an opposite outer side or surface 18 terminating in a peripheral edge 20 to define a panel of predetermined geometric shape. Deposited on inner side 16 over a predetermined area from peripheral edge 20 inward is a ceramic frit layer or coating 22, such as described above. In this alternative embodiment, surfaces 16, 18, and peripheral edge 20 receive a primer coating 24' similar to that described above but extending along surface 16, around peripheral edge 20 and along surface 18. Encapsulating peripheral edge 20 and extending inwardly along surfaces 16, 18 is a polymeric gasket 26' generally known as a three-sided encapsulation. Gasket 26' includes a lower surface 42' and a generally arcuate outer surface 46 which defines a lip 48 which overlaps, engages, and seals against vehicle outer surface 44 defined by sheet metal 34. The lower surface 42' of gasket 26' receives adhesion-promoting compound 28' which, in turn, is adhered by urethane adhesive 30 to pinch-weld flange 32.

Gasket 26' is preferably molded onto and bonded to panel 14 about at least a portion of the peripheral edge 20 and in some cases to a portion of frit layer 22. In those applications where it is desirable to close the gap between the panel peripheral edge 20 and the vehicle window opening, gasket 26' is formed so that it substantially encloses or encapsulates peripheral edge 20. Gasket 26' includes a body portion 38' from which a pair of securing flanges 50, 52 extend inwardly a predetermined distance over the opposing panel surfaces 16, 18, respectively. The lip portion 48 extends from body 38' in a direction generally opposite to securing flanges 50, 52 to engage and seal against the vehicle panel opening or body.

The adhesion-promoting compounds described above and applied to the gasket are particularly adapted to provide a strong adhesive bond between the gasket and the window fixing urethane adhesive. The compound is selected from the family of adhesion-promoting organic primers such as solvent-based modified acrylic primers, and preferably BETASEAL™ brand primer sold under the designation 435.55 and available from Essex Specialty Products, Inc. The BETASEAL™ brand primer designated 435.52 may also be used. Such primers have an improved adhesive characteristic when contacted to the gasket, and, when so contacted, their combination is exposed to a transition temperature of at least 60° C., and preferably between 80° C. and 180° C., and most preferably between 100° C. and 140° C. A transition temperature is that one temperature or range of temperatures at which adhesion properties are significantly improved. In general, the transition temperature will differ for a range of primers and gasket-compositions. The transition temperature for a given primer-gasket combination can be determined by heating a number of samples to different temperatures and then testing the bonding characteristics using standard techniques. The transition temperature is identified by a noticeable change in the curve defined by plotting bond strength versus temperature. For a more thorough discussion of transition temperatures, refer to U.S. Pat. No. 5,544,458 which is incorporated herein by reference.

Figure 7:
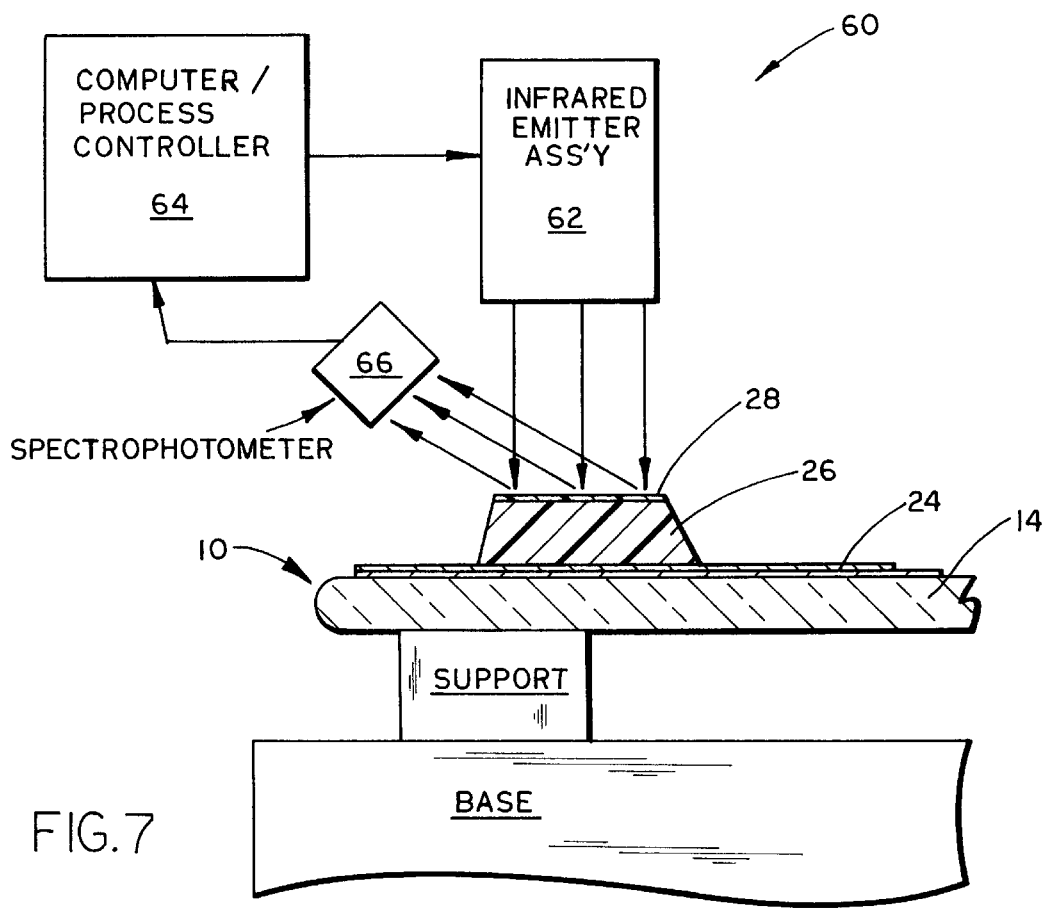
FIGS. 7 and 8 illustrate two embodiments of devices used to apply heat in the method of the present invention.
Figure 8:
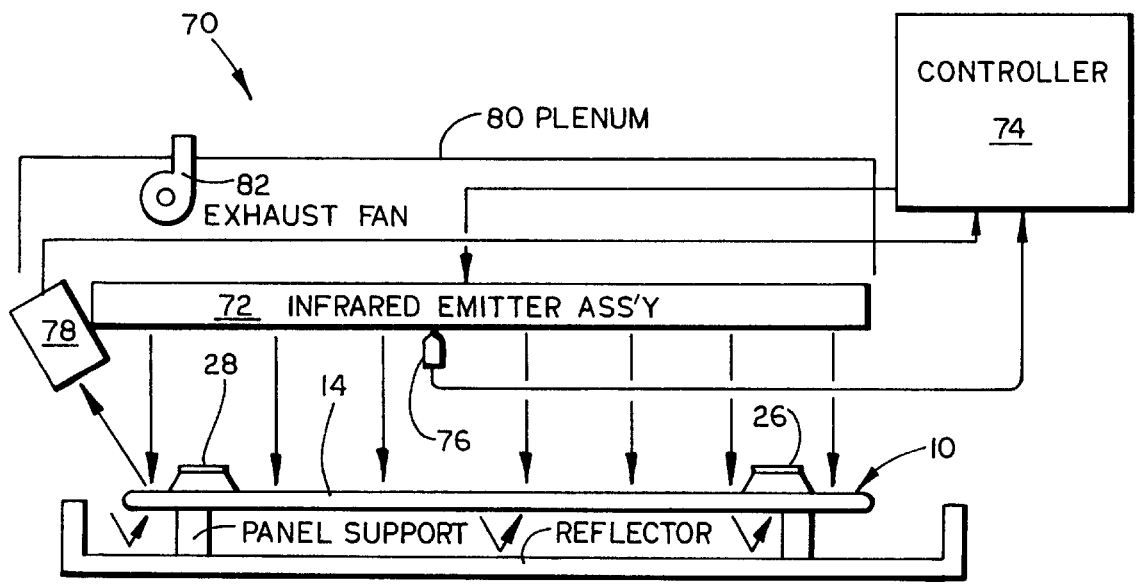

FIGS. 7 and 8 are schematic representations of two energy sources that may be used in conjunction with this invention to heat the adhesion-promoting compound/gasket combination described above. Although each source is described in relation to producing a particular energy spectrum, such as by way of example only. Other heat energy sources may be equally affective, such as convective, conductive, inductive, and resistive heat sources. Moreover, microwave energy may be used equally as well. It is contemplated that these or other heating sources may be adapted for use in achieving the primer-gasket combination transition temperature while the gasket is in the molding device, or after the molding operation and the window assembly has been removed from the molding tool.

FIG. 7 generally illustrates one embodiment of a controlled focused infrared (CFIR) source 60 which may be used to heat the gasket/compound combination after adhesion-promoting compound 28 has been applied to gasket 26. Moreover, source 60 may also be used to heat other components of the assembly prior to, during, or after the formation of gasket 26. Infrared source 60 includes one or more infrared emitter assemblies 62 such as Model 5305-104 made by Radiant Energy Research, Inc. of Minneapolis, Minn., and disposed above sheet 14 and gasket 26 in a pattern conforming to gasket 26. In the alternative, a single infrared emitter may be moved above gasket 26 by a guided robotic arm in a pattern conforming to that area receiving gasket 26. A computer/process controller 64 preferably causes infrared emitter assembly 62 to emit infrared energy into gasket 26 and adhesion-promoting compound 28. A spectrophotometer 66 coupled to computer/process controller 64 detects the energy reflected and radiated from panel assembly 10. Based upon the feedback from spectrophotometer 66, computer/process controller 64 adjusts the power of energy emitted by assembly 62 to obtain maximum absorption at the primer 28/gasket 26 interface, but limits the amount of energy so as not to melt or deform gasket 26. Absorption of the infrared energy by adhesion-promoting compound 28 and gasket 26 generates heat, preferably raising the temperature of the gasket/compound interface to at least 60° C., and preferably between 80° C. and 180° C., and most preferably between 100° C. and 140° C. for the preferred primer described above.

FIG. 8 schematically illustrates one embodiment of a controlled area infrared (CAIR) source 70 which may include one or more infrared emitters 72, such as model FB122425B3 made by Casso-Solar Corp. of Pimona, N.Y., and may be distributed above and aligned with panel assembly 10. Radiation generated by emitter 72 is controlled by a controller 74 based upon input from a thermocouple 76 attached to emitter 72, and a spectrophotometer 78 disposed at an angle with respect to panel assembly 10 adjacent emitter 72.

In order to reduce problems associated with heating and cooling of the gaskets, each of the above radiation sources may direct their energy to a restricted area of the gasket. For example, since it may be desired to heat only the interface between the adhesion-promoting compound and the gasket, each energy source 60, 70 may be adapted so that the radiation is applied only to the area of the panel having the gasket. Alternatively, each source may be moved around the sheet by a guided robotic arm or a mask may be used to limit the exposed area. Contemplated in both of the heating options described above, but shown only in FIG. 8, as a plenum 80 and an exhaust fan 82, to vent fumes driven off during the heating process. Moreover, each panel assembly 10 may be properly located with respect to each heating source by using a template or guide not shown.

Method

Both panel assemblies described above are manufactured according to a method which results in superior adhesion of the gasket to the painted or unpainted metal pinch-weld flange 32, and results in a joint having a performance significantly improved over what is achieved without benefit of this invention, and approaching or even exceeding joint strength at least equivalent to that produced by moisture-curable urethane adhesive 30 bonding frit layer 22 or glass surface 16 directly to pinch-weld flange 32. In testing, the adhesion obtained between the gasket and a sheet metal flange resulted in average shear values of greater than 800 PSI without preconditioning in a water bath, and exceeded 600 PSI after a 500-hour soak in 80° C. water, prior to a cohesive failure in the urethane adhesive 30. The adhesive bond between the gasket and adhesive 30 did not fail. Average shear values of greater than 600 PSI were obtained after the test specimens soaked for more than 50 hours in 80° C. water. Again, when a failure occurred, the failure mode was in the cohesiveness of the urethane adhesive 30. The specifics of the test parameters are described in greater detail below. In comparison, adhesion obtained between the gasket and the sheet metal pinch flange using the conventional approach resulted in an average shear value of approximately 450 PSI without preconditioning in a water bath. When loaded to failure, only a portion of the cohesive bond failed in cohesive mode when tested without preconditioning and 0% cohesive failure mode was found after water immersion testing. After soaking in an 80° C. water bath for 50 hours or more, the average shear drops below one-half that achieved without soaking and all failures were principally adhesive. The comparison confirms that the joint between the gasket and sheet-metal pinch flange exceeds that achieved using the conventional approach without the benefit of this invention.

Once panel 14 has been obtained, with or without frit layer 22 applied to surface 16, the surface of panel 14 or frit layer 22 to receive the gasket such as 26 is optionally cleaned. Glass primer 24 is applied to that portion which will be receiving the gasket and preferably to a slightly larger area. Following the application of the glass primer, panel 14 is transported to a mold assembly or a fixture to receive the gasket. The fabrication or molding of the gasket may be accomplished using a number of well-known techniques including injection molding, extrusion, reaction-injection molding, slush molding, pour molding, and casting, although the preferred technique is injection molding using the VISTA™ brand PVC material described above. Exemplary molding techniques are described in U.S. Pat. No. 5,331,784; U.S. Pat. No. 5,443,673; U.S. Pat. No. 5,475,956; and U.S. Pat. No. 5,544,458, the disclosures of which are hereby incorporated by reference.

Following the placement of the gasket such as 26 on panel 14, the surface 42 of the gasket 26 receives a coating of adhesion-promoting compound of this invention such as 28, 28' described above. The thickness of the adhesion-promoting compound may range between 0.001 mil and 10.0 mils and is preferably applied over the entire surface of the gasket which will be in contact with urethane adhesive bead 30. Adhesion-promoting compound 28, 28' may be applied either by wiping, daubing, spraying, or other suitable application technique which results in a suitably uniform coating. In the alternative, the adhesion-promoting compound could be applied to an inner surface of the mold corresponding to the gasket surface prior to the gasket forming operation. The compound could be applied to the surface of the mold in a number of ways, including spraying, brushing, wiping, rolling, and the like. The compound could also be applied as a film and inserted on the mold surface. To facilitate this technique, the mold surface may be made from, or cooled with, a material such as TEFLON™, which easily releases the compound and allows easy ejection of the window module from the mold. Following the application of compound 28, 28' heat is applied to the primer/gasket combination to raise the temperature thereof to at least 60° C., preferably between 80° C. and 180° C., and most preferably between 100° C. and 140° C.; that is, the transition temperature as described above. The heat may be applied using convection, conduction, radiation, or induction sources and may be done during or after gasket formation, or any combination thereof. The heating of the contact boundary between compound 28, 28' and gasket 26, 26' should be optionally and preferably monitored so as not to raise the temperature of the gasket to a point where it begins to flow or otherwise undergo dimensional changes. Examples of heating sources include a controlled area or a controlled focused infrared source such as is briefly described above and in greater detail in U.S. Pat. No. 5,544,458 mentioned earlier. The panel assembly is then allowed to cool and packaged for shipment to be sent to the automobile assembler or repair house.

In one test procedure, six, 9-inch square glass plaques containing a frit layer were primed with an A-57 primer which is an acrylic-based primer and allowed to dry in a hood for approximately 30 minutes. Each of the six plaques received six, 1-inch long×¼-inch wide×⅛-inch thick pieces of VISTA™ brand 484.51 PVC strips. Each of the PVC strips was bonded to the primed frit glass in a hot press at 325° F. for 4 minutes. A total of six PVC strips were disposed on each 9-inch square glass frit plaque. Once bonded, each of the PVC strips were trimmed exactly to be 1-inch long×¼-inch wide. Following bonding to the glass plaque, the PVC strips were cleaned with an isopropyl alcohol and then primed with the BETASEAL™ brand 435.55 adhesion-promoting compound as a primer coating. The samples were then allowed to dry for approximately 30 minutes. Of the six plaques, three were heated in an oven for 10 minutes at 130° C. (266° F.); the remaining three plaques were left at room temperature.

Figure 4:
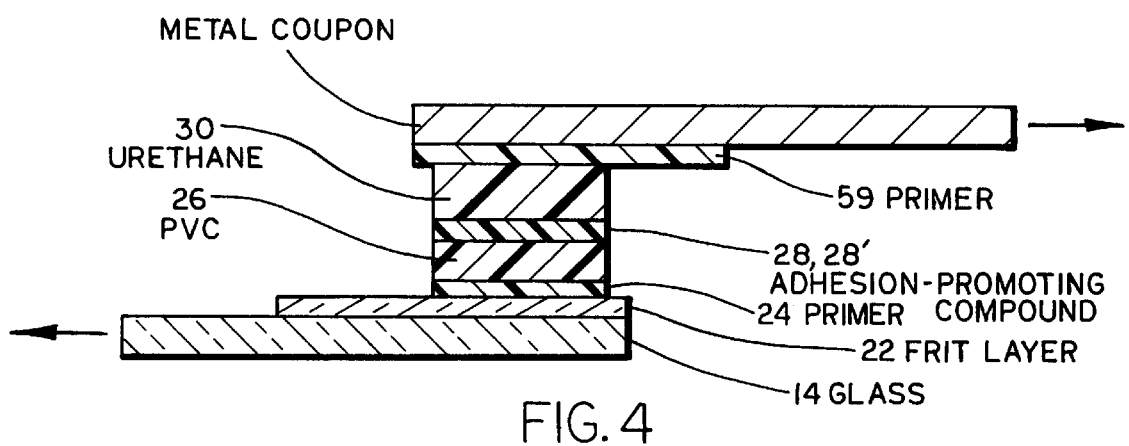
FIG. 4 illustrates, in elevation section view, one example of the bond assembly used in testing.

Following heating of the three samples, 36 E-coated metal strips or coupons were primed with BETASEAL™ brand 435.33 urethane-based body primer (primer 59 in FIG. 4) also available from Essex Specialty Products and allowed to dry in a hood for approximately 30 minutes. The 36 PVC strips on the glass plaques were coated with an BETASEAL™ brand 573.02 urethane. Finally, the E-coated (electro coated) and primed metal coupons were placed on the urethane, being sure to align the ¼-inch wide×1-inch long primed section (see FIG. 4). The samples were then allowed to cure for four days before testing. Once cured, six preheated samples and six unheated samples were tested (see FIG. 4); six more samples of each were tested after 50 hours of soaking in 80° C. water; the final six of each sample were tested in the same way after soaking 500 hours in 80° C. water. The samples were shear tested by pulling in the directions shown in FIG. 4 at a rate of one inch per minute. Table I illustrates the results of the peak loads experienced by each sample group.

TABLE I

| Hours Soaked in 80° C. Water Bath | Conventional Average Peak Load (PSI/Failure Mode) | Samples According to the Invention Heated for 10 Minutes at 130° C. Average Peak Load (PSI/Failure Mode) |
|---|---|---|
| 0 hours | 452.0/25% Cohesive | 874.8/100% Cohesive |
| 50 hours | 176.0/0% Cohesive | 629.2/100% Cohesive |
| 500 hours | 207.2/0% Cohesive | 623.3/100% Cohesive |

Figure 5:
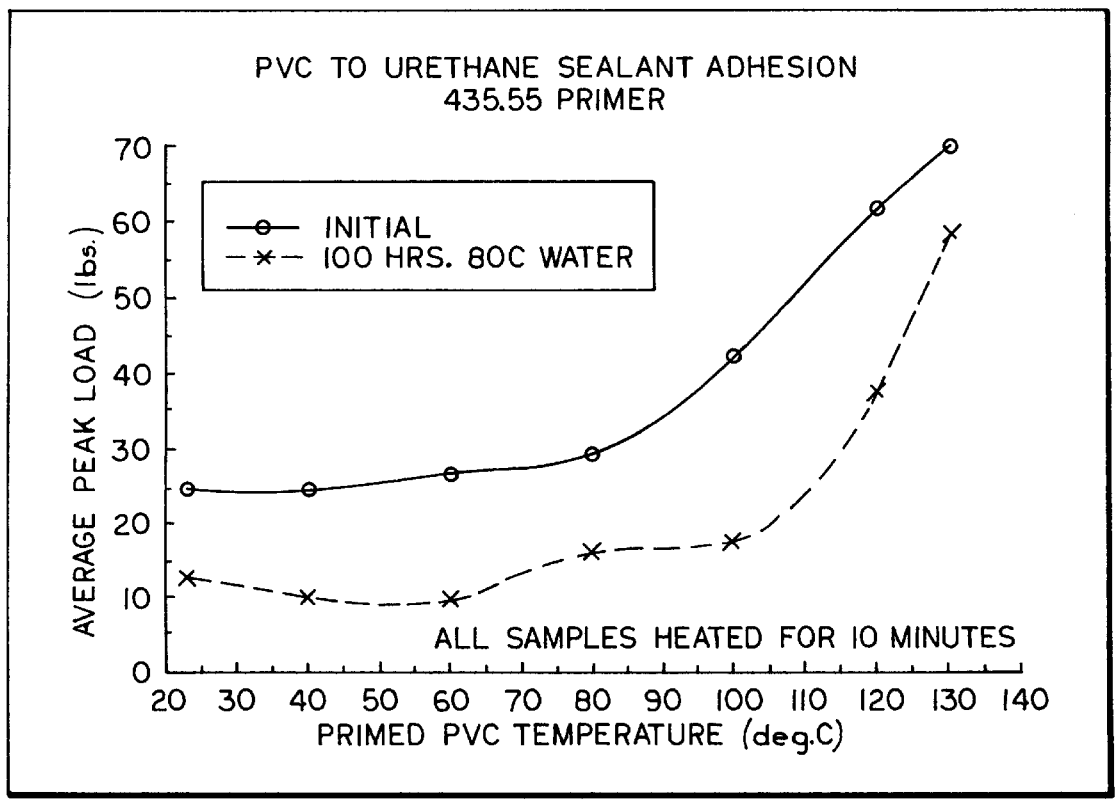
FIGS. 5 and 6 graphically illustrate the improved bond strength achieved by this invention.
Figure 6:
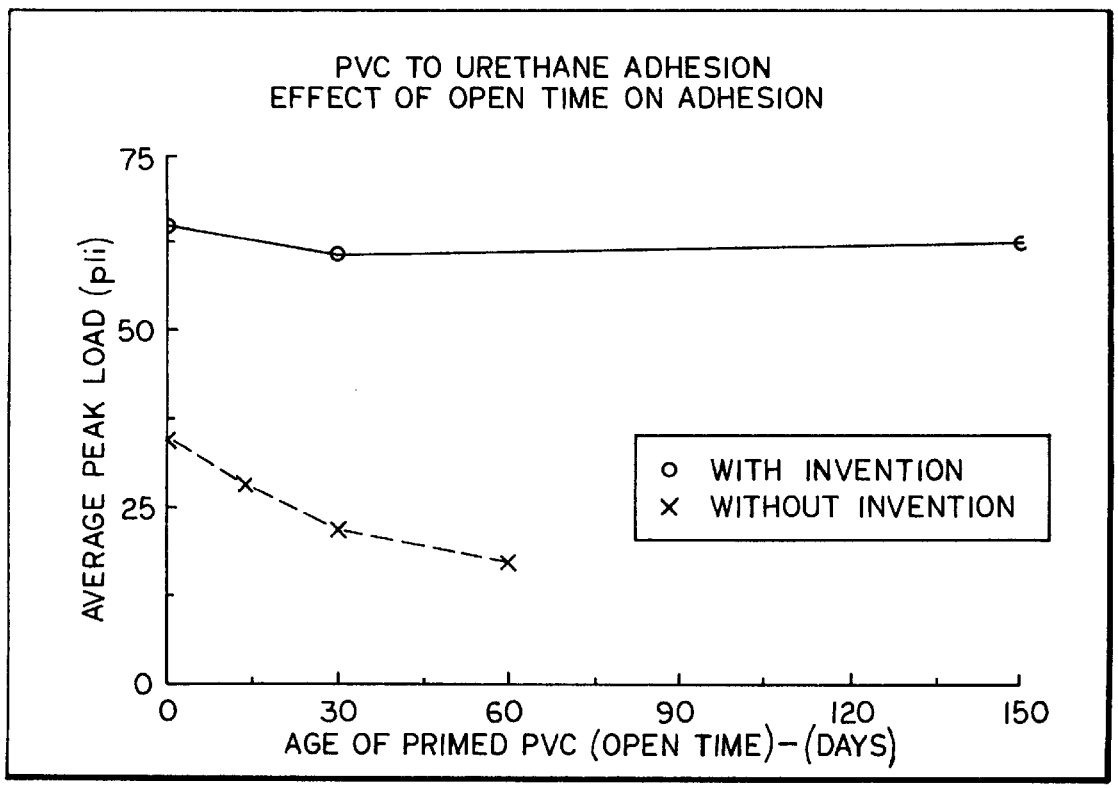

The graphs shown in FIGS. 5–6 illustrate the results of experiments where the BETASEAL™ brand 435.55 adhesion-promoting compound was brush-applied to a 1-inch×8-inch×0.125-inch strip of VISTA™ brand 484.51 PVC material. In generating the data shown in FIG. 5, PVC strips primed coating of BETASEAL™ brand 435.55 with the above primer were placed in a convection oven at various temperatures for 10 minutes. The primed PVC strips were removed from the oven and allowed several minutes to cool to ambient temperature. Two parallel beads of approximately ½-inch diameter BETASEAL™ brand 573.02 urethane sealant were applied to the primed PVC surface and a spreading tool was dragged across the urethane to provide a uniform sealant thickness of approximately 3/16 of an inch. After curing at ambient conditions for 72 hours, the PVC-urethane samples were tested in a 180° T-peel configuration of a rate of two inches per minute.

FIG. 5 graphically illustrates the average peak load for the strips tested as described above in pounds plotted against the temperature (in degrees centigrade) to which the samples were heated. Two curves illustrate the maximum bond strength achieved on samples without any conditioning (i.e., initial), and on samples soaked in 80° C. water for 100 hours. The unsoaked samples illustrate an improved bonding ability when the temperature of the adhesion-promoting compound/gasket interface has been raised to a temperature of at least about 80° C., while samples water-soaked for 100 hours show an improvement in bonding when the temperature has been raised to at least about 60° C.

FIG. 6 graphically illustrates the average peak load for the above test strips plotted against the age of the adhesion-promoting compound primed gasket of this invention before receiving the urethane adhesive, i.e., the "open time" for the assembly or test strips. The lower curve illustrates the average peak load of window panel samples manufactured according to conventional method and illustrates a steady decrease in the bonding ability with time. The upper curve, illustrating panels made according to the invention, shows a higher average peak load ability which is substantially flat out to at least 150 days after the panel assembly has been manufactured before the urethane adhesive is applied. This data suggests that the effectiveness of the bond provided by this invention is substantially unchanged before the urethane adhesive is applied. This suggests that the window assembly of this invention may be in storage for at least a day, at least a week, at least a month, or for a time as long as five months or more before the automobile installer applies the adhesive and mounts the window assembly in the vehicle without suffering degradation of the bond strength.

Figure 9A:
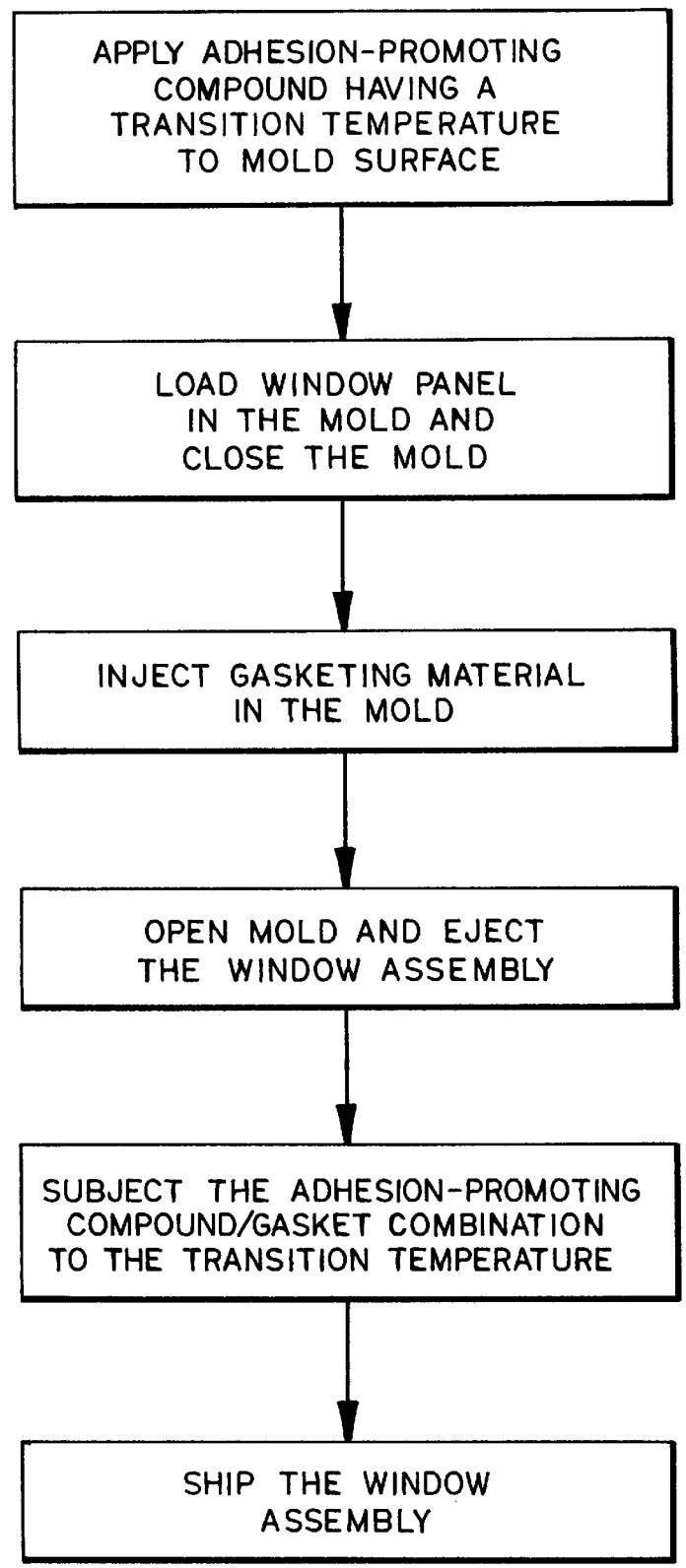
FIGS. 9A and 9B are flow charts illustrating embodiments of the method of this invention.
Figure 9B:
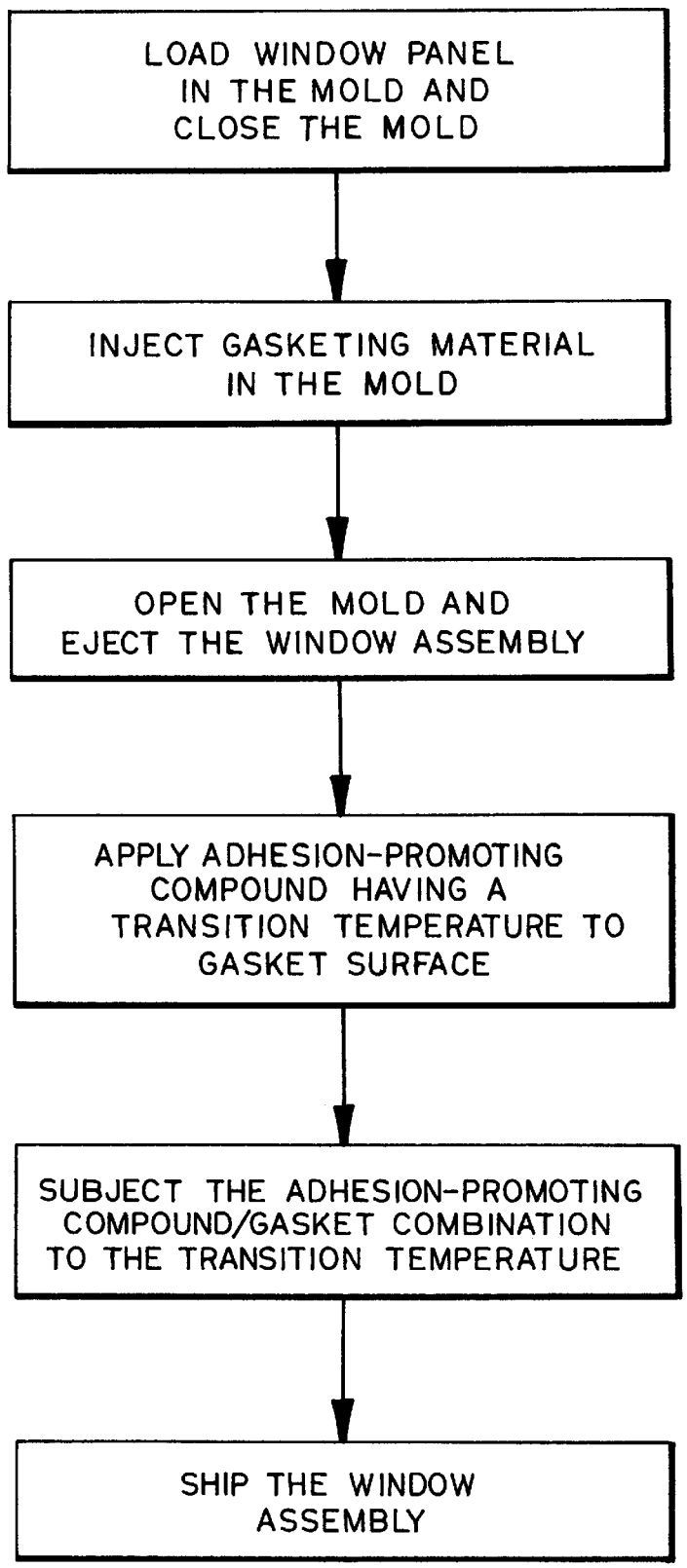

Referring to the schematic block diagrams of FIGS. 9A and 9B (where FIG. 9A describes in-mold application of the adhesion-promoting compound of this invention and FIG. 9B describes post-mold application of the adhesion-promoting compound of this invention), the method and assembly provided by this invention result in less labor steps by the window installer than prior window assembly installation procedures. Prior to this invention, the window was manufactured at a location off-site of the assembly plant. When received by the installer, the window often required preparation before installation in the vehicle. Such preparation included cleaning the window or panel and applying an adhesion-promoting compound without the benefit of this invention before applying the window fixing urethane adhesive. After preparation and application of the adhesive, the panel was located in the vehicle. A disadvantage was the panels had to be staged in a parallel process/procedure by the assembler before actual installation in the vehicle.

According to this invention, the panel may be prepped and primed before it reaches the assembler. The assembler only need apply the urethane adhesive to the panel and install it in the vehicle. The cleaning of the panel and priming of the bonding surface have already been completed by the panel manufacturer.

The above embodiments of panel assemblies offer several advantages over prior known structures. These advantages include an increased viewing area resulting from narrower frit layer coatings about the peripheral edge of the window panel, and narrower pinch-weld flanges since the bonding area and seal of window panel assembly 14 with the vehicle is substantially reduced. Another advantage is that the panel assembly 14 is manufactured and essentially prepped by the window panel manufacturer resulting in a step-saving procedure by the vehicle assembler when installing the window panel assembly. Thus, the window panel installer no longer needs to prime the panel, but only needs to apply the window fixing adhesive before installing the window panel in the vehicle. This results in faster installation times and a cost-savings to the automobile manufacturer.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

We claim:

1. In combination, a window panel assembly retained on a vehicle body adjacent an opening in said vehicle body, said combination comprising:
    a vehicle body having an opening therein;
    a window panel assembly including a window panel having opposite sides terminating in a peripheral edge, and a polymeric gasket bonded to at least one side of said window panel and having a surface to receive a window fixing adhesive for bonding said window panel to said vehicle body;
    an adhesion-promoting compound on said gasket surface; and
    a window fixing adhesive applied to said gasket surface on said adhesion-promoting compound;
    said adhesion-promoting compound having a transition temperature of at least 60° C. at or above which said adhesion-promoting compound exhibits improved adhesion qualities between said gasket and said window fixing adhesive, said adhesion-promoting compound being heated to a temperature equal to or greater than about 60° C. prior to receiving said window fixing adhesive;
    said window fixing adhesive positioned between said adhesion-promoting compound on said gasket and a portion of said vehicle body;
    said window panel assembly being bonded to said vehicle body portion adjacent said opening by said window fixing adhesive such that said window panel extends over said opening, said adhesion-promoting compound after said heating to said transition temperature providing improved bond strength between said gasket and said window fixing adhesive as compared to the bond strength achieved without heating said adhesion-promoting compound to said transition temperature.

2. The combination of claim 1 further including a ceramic frit layer on said one side of said window panel between said window panel and said gasket, and a primer layer between said ceramic frit layer and said gasket.

3. The combination of claim 2 wherein said adhesion-promoting compound includes an organic primer.

4. The combination of claim 3 wherein said organic primer includes a solvent-based modified acrylic primer; said window fixing adhesive including a urethane adhesive.

5. The combination of claim 4 wherein said transition temperature is between about 100° C. and 140° C., said adhesion-promoting compound being heated to a temperature between about 100° C. and 140° C.

6. The combination of claim 5 wherein said polymeric gasket is a thermoplastic elastomer selected from the group consisting of thermoplastic vulcanizates, thermoplastic urethanes, thermoplastic olefins, EPDMs, polyolefins, polyvinyls, and thermosetting materials.

7. The combination of claim 1 wherein said adhesion-promoting compound includes a solvent-based modified acrylic primer; said window fixing adhesive including a urethane adhesive.

8. The combination of claim 1 wherein said transition temperature is between about 100° C. and 140° C., said adhesion-promoting compound being heated to a temperature between about 100° C. and 140° C.

9. The combination of claim 1 wherein said polymeric gasket is a thermoplastic elastomer selected from the group consisting of thermoplastic vulcanizates, thermoplastic urethanes, thermoplastic olefins, EPDMs, polyolefins, polyvinyls, and thermosetting materials.

10. A window panel assembly for attachment to a vehicle adjacent an opening in the vehicle body, comprising:
    a sheet-like window panel having first and second opposing surfaces terminating in a peripheral edge;
    a polymeric gasket having one surface attached to said sheet-like panel and an opposite surface for receiving a window fixing adhesive for engagement with the vehicle body adjacent a vehicle body opening;
    an adhesion-promoting compound on said opposite surface of said gasket, said adhesion-promoting compound being applied to said opposite surface of said gasket at a time in advance of and at a different location from the location where the window fixing adhesive is applied, said adhesion-promoting compound including an organic primer, said organic primer including a solvent-based modified acrylic primer, said compound having a transition temperature at or above which said adhesion-promoting compound exhibits improved adhesion properties for adhering said polymeric gasket to the window fixing adhesive for engagement with the vehicle body,
    said adhesion-promoting compound being heated to a temperature greater than or equal to said transition temperature while on said gasket prior to locating the window panel assembly adjacent the vehicle body opening;
    whereby said adhesion-promoting compound provides a strong, durable joint between said gasket and the window fixing adhesive without further preparation of said adhesion-promoting compound and gasket when the window fixing adhesive is applied to said gasket on said adhesion-promoting compound after said adhesion-promoting compound has been previously applied and heated to said transition temperature, said window panel assembly adapted to be adhered to a surface of the vehicle body with the window fixing adhesives.

11. A window panel assembly for retention on a vehicle adjacent an opening in the vehicle body by a window fixing adhesive, comprising:
    a window panel having opposite sides terminating in a peripheral edge;

a polymeric gasket bonded to at least one side of said window panel and having a surface to receive the window fixing adhesive for bonding the window panel to the vehicle body adjacent the vehicle body opening; and an adhesion-promoting compound on said gasket surface, said adhesion-promoting compound being applied to said surface of said gasket at a time in advance of and at a different location from the location where the window fixing adhesive is applied, said compound having a transition temperature of at least about 60° C. above which said adhesion-promoting compound exhibits improved adhesion properties for adhering said polymeric gasket to the window fixing adhesive, said adhesion-promoting compound being heated to a temperature greater than or equal to about 60° C. prior to receiving the window fixing adhesive, and adapted to interact with the window fixing adhesive when said adhesive is applied whereby said adhesion-promoting compound provides a strong, durable joint between said gasket and the window fixing adhesive without further preparation of said adhesion-promoting compound and gasket when the window fixing adhesive is applied to said gasket on said adhesion-promoting compound after said adhesion-promoting compound has been heated to said transition temperature;

said gasket and the window fixing adhesive being joined such that a load between said gasket and the window fixing adhesive sufficient to cause a failure produces a cohesive failure of at least one of said gasket and the window fixing adhesive, but not an adhesive failure between said gasket and the window fixing adhesive;

a ceramic frit layer deposited on at least a portion of one of said sides of said window panel; and a primer layer between said ceramic frit layer and said gasket, said adhesion-promoting compound including an organic primer, said organic primer including a solvent-based modified acrylic primer.

12. The window panel assembly as defined in claim 11, wherein said adhesion-promoting compound is heated to said transition temperature while in contact with said gasket.

13. The window panel assembly as defined by claim 11, wherein said transition temperature is approximately between 80° C. and 180° C.

14. The window panel assembly as defined by claim 11, wherein said transition temperature is approximately between 100° C. and 140° C.

15. The window panel assembly as defined by claim 11, wherein said window panel is selected from the group consisting of transparent glass, tempered glass, laminated glass, opaque glass, coated glass, transparent plastic, coated plastic, opaque plastic, and multi-composite laminate.

16. The window panel assembly as defined by claim 11, wherein said gasket is formed from the group consisting of thermoplastic rubbers, thermoplastic urethanes, thermoplastic olefins, EPDMs, polyolefins, thermosetting reaction-injection molded urethanes, and thermoplastic vinyls.

17. A window panel assembly for attachment to a vehicle adjacent an opening in the vehicle body, comprising:

a sheet-like window panel having first and second opposing surfaces terminating in a peripheral edge;

a polymeric gasket encapsulating said peripheral edge, extending inwardly along said first and second opposing surfaces, and having one surface attached to said sheet-like panel and an opposite surface for receiving a window fixing adhesive for engagement with the vehicle body adjacent a vehicle body opening;

an adhesion-promoting compound on said opposite surface of said gasket, said adhesion-promoting compound being applied to said opposite surface of said gasket at a time in advance of and at a different location from the location where the window fixing adhesive is applied, said compound having a transition temperature at or above which said adhesion-promoting compound exhibits improved adhesion properties for adhering said polymeric gasket to the window fixing adhesive for engagement with the vehicle body said adhesion-promoting compound being heated to a temperature greater than or equal to said transition temperature while on said gasket prior to locating the window panel assembly adjacent the vehicle body opening;

whereby said adhesion-promoting compound provides a strong, durable joint between said gasket and the window fixing adhesive without further preparation of said adhesion-promoting compound and gasket when the window fixing adhesive is applied to said gasket on said adhesion-promoting compound after said adhesion-promoting compound has been previously applied and heated to said transition temperature, said window panel assembly adapted to be adhered to a surface of the vehicle body with the window fixing adhesive.

18. A window panel assembly for attachment to a vehicle adjacent an opening in the vehicle body, comprising:

a sheet-like window panel having first and second opposing surfaces terminating in a peripheral edge;

a polymeric gasket having one surface attached to said sheet-like panel and an opposite surface for receiving a window fixing adhesive for engagement with the vehicle body adjacent a vehicle body opening;

an adhesion-promoting compound on said opposite surface of said gasket, said adhesion-promoting compound being applied to said opposite surface of said gasket at a time in advance of and at a different location from the location where the window fixing adhesive is applied, said compound having a transition temperature at or above which said adhesion-promoting compound exhibits improved adhesion properties for adhering said polymeric gasket to the window fixing adhesive for engagement with the vehicle body, said adhesion-promoting compound being heated to a temperature greater than or equal to said transition temperature while on said gasket prior to locating the window panel assembly adjacent the vehicle body opening; and a window fixing adhesive on said adhesion-promoting compound for retaining the window panel assembly on the vehicle body adjacent the vehicle body opening;

said adhesion-promoting compound providing a strong, durable joint between said gasket and said window fixing adhesive without further preparation of said adhesion-promoting compound and gasket when the window fixing adhesive is applied to said gasket on said adhesion-promoting compound after said adhesion-promoting compound has been previously applied and heated to said transition temperature, said joint having a bond strength and overall performance significantly better than achieved without heating said adhesion-promoting compound to said transition temperature.

19. The panel assembly as defined in claim 18, wherein said gasket is bonded to at least one surface of said sheet-like window panel.

20. The panel assembly as defined in claim 18, wherein said gasket is bonded to said first surface of said sheet-like window panel.

21. The panel assembly as defined in claim 18, wherein said adhesion-promoting compound includes an organic primer.

22. The panel assembly as defined in claim 18 wherein said transition temperature is approximately between 60° C. and 180° C.

23. The panel assembly as defined in claim 18, wherein said transition temperature is approximately between 100° C. and 140° C.

24. The panel assembly as defined in claim 18, wherein said gasket is a thermoplastic material.

25. The panel assembly as defined in claim 24, wherein said thermoplastic material is a thermoplastic elastomer selected from the group consisting of thermoplastic vulcanizates, thermoplastic urethanes, thermoplastic olefins, EPDMs, polyolefins, polyvinyls, and thermosetting materials.

26. The panel assembly as defined in claim 18, wherein said sheet-like panel is selected from the group consisting of glass, plastic, and multi-composite laminates.

27. The window panel assembly as defined by claim 18, further including:

a ceramic frit layer deposited on at least a portion of one of said first and second surfaces of said window panel; and a primer layer between said ceramic frit layer and said gasket.

28. The window panel assembly as defined by claim 27, wherein said adhesion-promoting compound includes an organic primer.

* * * * *

UNITED STATES PATENT AND TRADEMARK OFFICE
CERTIFICATE OF CORRECTION

PATENT NO.    : 5,864,996
DATED         : February 2, 1999
INVENTOR(S)   : Veldman et al.

It is certified that error appears in the above-identified patent and that said Letters Patent is hereby corrected as shown below:

Column 14,
Line 10, between "body" and "said" insert -- , --.

Column 15,
Line 4, between "18" and "wherein" insert -- , --.

Signed and Sealed this

Eleventh Day of February, 2003

JAMES E. ROGAN
*Director of the United States Patent and Trademark Office*